(12) United States Patent
Chandrashekar et al.

(10) Patent No.: US 12,075,527 B2
(45) Date of Patent: Aug. 27, 2024

(54) RETRIEVING A CORE NETWORK OR ACCESS NETWORK ASSIGNED USER EQUIPMENT IDENTIFIER

(71) Applicant: Nokia Technologies OY, Espoo (FI)

(72) Inventors: Subramanya Chandrashekar, Bangalore (IN); Cinzia Sartori, Pullach (DE); Laurent Thiebaut, Antony (FR)

(73) Assignee: Nokia Technologies OY, Espoo (FI)

( * ) Notice: Subject to any disclaimer, the term of this patent is extended or adjusted under 35 U.S.C. 154(b) by 0 days.

(21) Appl. No.: 17/341,798

(22) Filed: Jun. 8, 2021

(65) Prior Publication Data
US 2022/0014903 A1 Jan. 13, 2022

(30) Foreign Application Priority Data

Jul. 8, 2020 (IN) .............................. 202041029030

(51) Int. Cl.
*H04W 8/28* (2009.01)
*H04W 24/08* (2009.01)
*H04W 76/11* (2018.01)

(52) U.S. Cl.
CPC ............. *H04W 8/28* (2013.01); *H04W 24/08* (2013.01); *H04W 76/11* (2018.02)

(58) Field of Classification Search
CPC ......... H04L 45/28; H04L 45/48; H04L 41/12; H04L 45/02; H04W 24/08; H04W 40/248; H04W 76/11; H04W 8/28; H04W 84/047; H04W 40/02; H04W 40/18; H04W 40/22
See application file for complete search history.

(56) References Cited

U.S. PATENT DOCUMENTS

| | | | |
|---|---|---|---|
| 7,602,795 B1 * | 10/2009 | Mazza-Deblauwe | H04W 4/18 370/466 |
| 10,582,371 B1 | 3/2020 | Abraham et al. | |
| 10,674,421 B2 * | 6/2020 | Jin | H04W 40/04 |
| 2013/0308450 A1 * | 11/2013 | Zhou | H04L 47/805 370/230 |
| 2018/0249389 A1 | 8/2018 | Zhu et al. | |
| 2019/0394833 A1 | 12/2019 | Talebi Fard et al. | |
| 2020/0092710 A1 | 3/2020 | Kim et al. | |

(Continued)

OTHER PUBLICATIONS

O-RAN.WG2.A1AP-v01.01, ORAN Working Group 2 A1 interface: Application Protocol, O-RAN Alliance, 2020, pp. 1-52.

(Continued)

*Primary Examiner* — Zhensheng Zhang
(74) *Attorney, Agent, or Firm* — HARNESS, DICKEY & PIERCE, P.L.C.

(57) ABSTRACT

An apparatus for retrieving at least one of an access network or core network assigned user equipment identifier (NGAP ID) from outside of the access or core network using IP addressing information. The apparatus configured to receive IP addressing information of the user equipment; determine a subscriber permanent user identity for the user equipment from the IP addressing information; generate and transmit a request for the at least one of the access network or core network assigned user equipment identifier, the request including the subscriber permanent identity; and receive the at least one of the access network or core network assigned user equipment identifier.

6 Claims, 3 Drawing Sheets

(56) References Cited

U.S. PATENT DOCUMENTS

2020/0145432 A1 5/2020 Verma et al.
2020/0145902 A1 5/2020 Cui et al.

OTHER PUBLICATIONS

Search Report for European Application No. 21180428.1 dated Dec. 2, 2021.
Nokia et al: "KI3: Update to Solution 42", 3GPP Draft;S2-2007769, 3rd Generation Partnership Project (3GPP), Mobile Competence Centre ; 650, Route Des Lucioles ; F-06921 Sophia-Antipolis Cedex ; France, SA WG2, Elbonia; Oct. 12, 2020-Oct. 23, 2020 Oct. 2, 2020 (Oct. 2, 2020).
European Examination Report for European Application No. 21180428.1 mailed Dec. 1, 2023.
Change Request 38.413 CR 0223, Current Version 15.4.0, 36PP TSG-RAN WG3 #105, Tdoc RE-194186, 26 pages.

\* cited by examiner

RETRIEVING A CORE NETWORK OR ACCESS NETWORK ASSIGNED USER EQUIPMENT IDENTIFIER

CROSS-REFERENCE TO RELATED APPLICATIONS

The present application claims priority under 35 U.S.C. § 119 to Indian Patent Application No. 202041029030, filed on Jul. 8, 2020, in the Indian Patent Office, the entire contents of which are hereby incorporated by reference.

TECHNOLOGICAL FIELD

Various example embodiments relate to ways of retrieving a core network or access network assigned user equipment identifier from outside of the core or access network.

BACKGROUND

User equipment access data networks such as applications running on an edge application server via non-wired networks, such as RAN (radio access network) or wireless access networks. The access network controller that manages these non-wired networks may not have visibility of the user equipment ID used within the access network and on the interface between the access network and core network. Thus, the controller may be able to apply policies for user equipment on a cell by slice or group of user equipment, but policies on an individual user equipment are more difficult to implement.

Furthermore, where a user equipment is using the data services of an application, the application may want to know the service experience related to the radio conditions experienced by the UE in order to enhance performance. Without knowing the core network or access network assigned UE ID, that is the ID identifying the UE within the network such information is difficult to retrieve.

It would be desirable to be able to determine an access network or core network assigned user equipment identity outside of the access or core network. Such information allows the service experience to be retrieved and policies to individual user equipment to be applied.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments there is provided according to a first aspect an apparatus comprising means for retrieving at least one of an access network or core network assigned user equipment identifier, said means being configured to: receive IP addressing information of said user equipment; determine a subscriber permanent user identity for said user equipment from said IP addressing information; generate and transmit a request for said at least one of said access network or core network assigned user equipment identifier, said request including said subscriber permanent identity; and receive said at least one of said access network or core network assigned user equipment identifier.

User equipment are identified in different ways in different networks depending on the protocols used. Thus, when a data network is communicating with a user equipment it will identify the user equipment using IP addressing, whereas there will be a network assigned identity for the user equipment within the access or the core network and on the interface between them. Different functions managing communications between the data network and the core network may have access to some of this information and the inventors of the present invention recognised that one way of retrieving such identifiers from outside of the core or access network might be to query different functions using the IP address information that the user equipment uses to communicate with an application. The IP addressing information could be used to retrieve the subscriber permanent user identity SUPI and this in turn could be used by querying a further function to retrieve the core network or access network assigned user equipment identifier. This identifier allows radio status information regarding the UE within the access network, that may be required by the data network to be retrieved from the core or access network and/or policies to be applied by a controller to a specific user equipment within the access or core network.

In some embodiments the IP addressing information is retrieved from an application providing data services to the user equipment.

In some embodiments, said request for said at least one of said access network or core network assigned user equipment identifier further comprises a request for an identifier of a node in said access network that is currently serving said user equipment.

In some embodiments, said means configured to determine said subscriber permanent user identity is configured to generate a request requesting said subscriber permanent identity of said user equipment, said request including IP addressing information for said user equipment; and to receive said subscriber permanent identity of said user equipment.

In some embodiments, said apparatus is configured to retrieve both of an access network and core network assigned network user equipment identifier.

In some embodiments, prior to generating said request for at least one of said access network or core network assigned user equipment identifier, said means is configured to: generate a request requesting an identity of a core entity managing access and mobility for said user equipment identified by said subscriber permanent identity; transmit said request to a subscriber information data store; and on receiving the identity of the core entity, transmit said request for said at least one of said access network or core network assigned user equipment identifier to said identified core entity.

In some embodiments, said request for said at least one of said access network or core network assigned user equipment identifier comprises a subscribe request, said subscribe request requesting said at least one identifier and requesting any updates to said at least one identifier.

In some embodiments, said means is further configured to: transmit a signal comprising said at least one of said access network or core network assigned user equipment identifier to an entity configured to monitor and/or influence network access functions.

In some embodiments the entity configured to monitor and/or influence network access functions comprises a non-real time or a near real time radio access network intelligent controller.

In some embodiments, said means is configured to receive a request for the identity of user equipment using data services provided by an application; and in response to said request to generate a request for IP addressing information of said user equipment and to transmit said request to said application.

In some embodiments, said apparatus comprises an edge computing application function (EC AF) and in other embodiments, said apparatus comprises a network exposure function (NEF) in some cases under the control of the EC AF.

According to various, but not necessarily all, embodiments there is provided according to a second aspect an apparatus for managing access and mobility of user equipment within a network, said apparatus comprising means configured: to receive a request for at least one of an access network or core network assigned user equipment identifier of a user equipment identified in said request by a subscriber permanent identity transmitted with said request; and to generate and transmit a signal comprising said at least one of said access network or core network assigned user equipment identifier.

In some embodiments said request comprises a subscribe request requesting said at least one of said access network or core network assigned user equipment identifier and any updates to said identifier in response to changes of said network user equipment identifier.

In some embodiments, said request further comprises a request for an identifier of a node in said access network currently serving said user equipment, said means being configured to generate and transmit a response comprising an identifier identifying said node.

In some embodiments, said generated signal includes an indication that said user equipment is no longer served by an access network.

In some embodiments said apparatus comprises a function configured to control access and mobility of the UEs and terminate the core and access network interface, in some embodiments, said function comprises an access and mobility managing function (AMF).

According to various, but not necessarily all, embodiments there is provided according to a third aspect an apparatus for monitoring and/or influencing network access functions, said apparatus comprising means configured to: generate a request for the identity of user equipment using data services provided by an application; and receive at least one of an access network or core network assigned user equipment identifier identifying said user equipment using said data services; and use said at least one identifier to request an access node to provide information about said user equipment and/or to configure an access node about said user equipment.

Example embodiments seek the identity of a user equipment using data services provided by an application and in some embodiments, the request further specifies at least one pre-defined access network criteria that the user equipment satisfies. This information is used to either retrieve information in some embodiments related to the radio conditions experienced by the user equipment from an access node or to reconfigure the access node with respect to the user equipment to improve the performance of the user equipment.

In some embodiments, said apparatus comprises means configured to: receive a request containing at least one of an access network or core network assigned user equipment identifier identifying said user equipment using said data services; and use said at least one identifier to request an access node serving said user equipment to provide information about said user equipment and/or to configure an access node about said user equipment.

In some embodiments, said apparatus comprises an entity configured to monitor and/or influence network access functions and in some embodiments said apparatus comprises a non-real time or a near real time radio access network intelligent controller.

According to various, but not necessarily all, embodiments there is provided according to a fourth aspect a system comprising an apparatus according to a first aspect, an apparatus according to a second apparatus and an apparatus according to a third aspect.

In some embodiments the means of any preceding aspect or embodiment comprise: at least one processor; and at least one memory including computer program code, said at least one memory and computer program code being configured to, with said at least one processor, cause the performance of the apparatus.

According to various, but not necessarily all, embodiments there is provided according to a further aspect a method for retrieving at least one of an access network or core network assigned user equipment identifier, said method comprising: determining a subscriber permanent user identity for said user equipment from received IP addressing information; generating a request for said at least one of said access network or core network assigned user equipment identifier, said request including said subscriber permanent identity.

In some embodiments, said method further comprises receiving said at least one of said access network or core network assigned user equipment identifier.

In some embodiments, said request for said at least one of said access network or core network assigned user equipment identifier further comprises a request for an identifier of a node in said access network that is currently serving said user equipment.

In some embodiments, said step of determining said subscriber permanent user identity comprises: generating a request requesting said subscriber permanent identity of said user equipment, said request including IP addressing information for said user equipment; and receiving said subscriber permanent identity of said user equipment.

In some embodiments said request is transmitted to a function within the core network such as a binding support function comprising both subscriber permanent identity data and IP addressing information for user equipment.

In some embodiments, said step of retrieving comprises retrieving both of said access network and said core network assigned network user equipment identifier.

In some embodiments, prior to generating said request for at least one of said access network or core network assigned user equipment identifier, said method: generates a request requesting an identity of a core entity managing access and mobility for said user equipment identified by said subscriber permanent identity; transmits said request to a subscriber information data store; and in response to receiving the identity of the core entity, transmits said request for said at least one of said access network or core network assigned user equipment identifier to said identified core function.

In some embodiments, said request for said at least one of said access network or core network assigned user equipment identifier comprises a subscribe request, said subscribe request requesting said at least one identifier and requesting any updates to said at least one identifier.

In some embodiments said IP addressing information is received in signaling corresponding to an application request for information about said user equipment or to configure network settings related to said user equipment In some embodiments, said IP addressing information is received in signaling comprising IP addressing information of said user equipment corresponds to an application notification about users accessing a specific service.

In some embodiments, said received IP addressing information of said user equipment corresponds to an application notification about users accessing a specific service and in some embodiments satisfying at least one pre-defined access network criteria.

In some embodiments, said method further comprises a step of: transmitting a signal comprising said at least one of said access network or core network assigned user equipment identifier to an entity configured to monitor and/or influence network access functions.

In some embodiments, the entity may be a non-real time or near real time radio access network intelligent controller.

In some embodiments, the method further comprises: receiving a request for the identity of user equipment using a particular service provided by an application and in some cases satisfying at least one pre-defined access network criteria; and in response to said request generating a request for IP addressing information of user equipment and transmitting said request to said application.

In some embodiments the method is performed on an edge computing application function (EC AF) and in other embodiments, said method is performed on a network exposure function (NEF) in some cases under the control of the EC AF.

According to various, but not necessarily all, embodiments there is provided according to a further aspect a method for managing access and mobility of user equipment within a network, said method comprising: receiving a request for at least one of an access network or core network assigned user equipment identifier of a user equipment identified in said request by a subscriber permanent identity transmitted with said request; and generating a signal comprising said at least one of said access network or core network assigned user equipment identifier.

In some embodiments, the method is performed on a function within the core, in some embodiments on a function that controls access and mobility of the UEs and may terminate the core and access network interface, in some embodiments, this function is an AMF access and mobility managing function.

In some embodiments, said method further comprises transmitting said generated signal to the requester of the signal. In some embodiments, the transmitted signal is transmitted as a response, while in others it is transmitted as a further notification.

In some embodiments, said request comprises a subscribe request requesting said at least one of said access network or core network assigned user equipment identifier and any updates to said identifier in response to changes of said network user equipment identifier.

In some embodiments, said request further comprises a request for an identifier of a node in said access network currently serving said user equipment, said method generating and transmitting a response comprising an identifier identifying said node.

In some embodiments, said method signaling to the requester an indication that the said user equipment is no longer served by an access network.

According to various, but not necessarily all, embodiments there is provided according to a further aspect a method for monitoring and/or influencing network access functions, said method comprises: generating a request for the identity of user equipment using data services provided by an application; receiving at least one of an access network or core network assigned user equipment identifier identifying said user equipment using said data services; and using said at least one identifier to request an access node to provide information about said user equipment and/or to configure an access node with respect to said user equipment.

In some embodiments the method may be performed on a non-real time or a near real time radio network intelligent controller.

According to various, but not necessarily all, embodiments there is provided according to a further aspect a method for monitoring and/or influencing network access functions, said method comprising: receiving a request containing at least one of an access network or core network assigned user equipment identifier identifying said user equipment using said data services; and transmitting a control signal to a node serving said user equipment to request said node to provide information about said user equipment and/or to configure said node with respect to said user equipment.

In some embodiments the method may be performed on a non-real time or a near real time radio network intelligent controller.

According to various, but not necessarily all, embodiments there is provided according to an aspect a computer program which when executed by a processor is operable to control said processor to perform a method according to a further aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

DETAILED DESCRIPTION

Before discussing the example embodiments in any more detail, first an overview will be provided.

Embodiments relate to a method for mobile edge computing (MEC) to retrieve network assigned UE IDs using the application IP address. The network assigned UE ID may be the NGAP ID assigned by either NG-RAN node or by AMF that uniquely identifies the UE across the NG interface between the access network and core network.

RAN (radio access network) and RIC (as defined by ORAN open radio access network) by design are not aware of the permanent UE's ID for privacy reasons. This inhibits the radio access network intelligent controller, such as the RIC (RAN intelligent controller) from influencing the operation of individual UEs. If a per UE policy is to be applied by the RIC, then the RIC should have information regarding the UE ID used by the network, in some embodiments, the UE NGAP ID, assigned by either NG-RAN node or by AMF.

Similarly where an edge computing application APP for example is running on an Edge Application Server (EAS) and this requests radio related information about a UE that the application can only identify via addressing information (IP address, TCP/UDP port) that the UE uses to reach the application then this too requires the UE NGAP ID. The APP contacts an Edge Computing Application Function (EC AF) to get radio related information about the UE and the EC AF gets the NGAP identifier of the UE which allows it to be able to fetch information from the NG RAN (in some embodiments the gNB) serving the UE.

In ORAN systems two new entities in the SMO (service management orchestration) domain have been introduced, the Non-RT RIC (non-real time RAN intelligent controller) and the Near-RT RIC).

Non-RT RIC in SMO uses A1 interface to support intelligent RAN optimization by providing policy-based guidance Declarative Policies, ML model management and Enrichment Information to guide near-RT RIC.

A1 is defined in ORAN-WG2.A1.AP: A1 Application Protocol and connects Non-RT RIC to Near-RT RIC using a RESTful interface to send "Declarative" policies to Near-RT RIC. The A1 Policy includes the scope identifier which defines the object/resource to which the policy applies. Scope Identifier can be ueid, groupId, sliceId, qosId, cellId.

Near-RT RIC receives Policy on A1 interface and uses E2 interface to provide lower level Imperative Policies to guide RAN optimization. When receiving A1 Policy with UE ID as scope identifier, the near-RT RIC runs its own algorithm and sends an E2 Imperative Policy for the given UE ID to the RAN.

The E2 interface is defined in ORAN-WG3.E2GAP-v01.00. E2 is a C-plane interface and Imperative Policies can as well be sent over this interface. The general principles for the specification of the E2 interface are as follows:
- E2 should support the ability to provide UE ID information towards the Near-RT RIC based on a pre-configured trigger event.
- E2 should support the ability to send control messages (e.g. UE basis, Cell basis) to the E2 Node.
- E2 should support the ability to provide the E2 Node with a set of policies to use when defined events occur.

A UE-specific POLICY could be provided based on the following two cases:
- a. Non-Real time RIC sending a UE-specific POLICY (with UE-ID) over A1 interface that directly terminates in the gNB or in the near-RT RIC. In the latter case, upon receiving a UE specific-A1 POLICY, the Near RT RIC issues a E2 POLICY for the given UE.
- b. Near RT RIC generating UE-specific POLICY over E2 without any dependence over non-RT RIC.

Embodiments address the UE-specific POLICY of both non-RT RIC and near-RT RIC.

It should be noted that generally references to RIC include both non-RT RIC and near-RT RIC.

Figure 1:
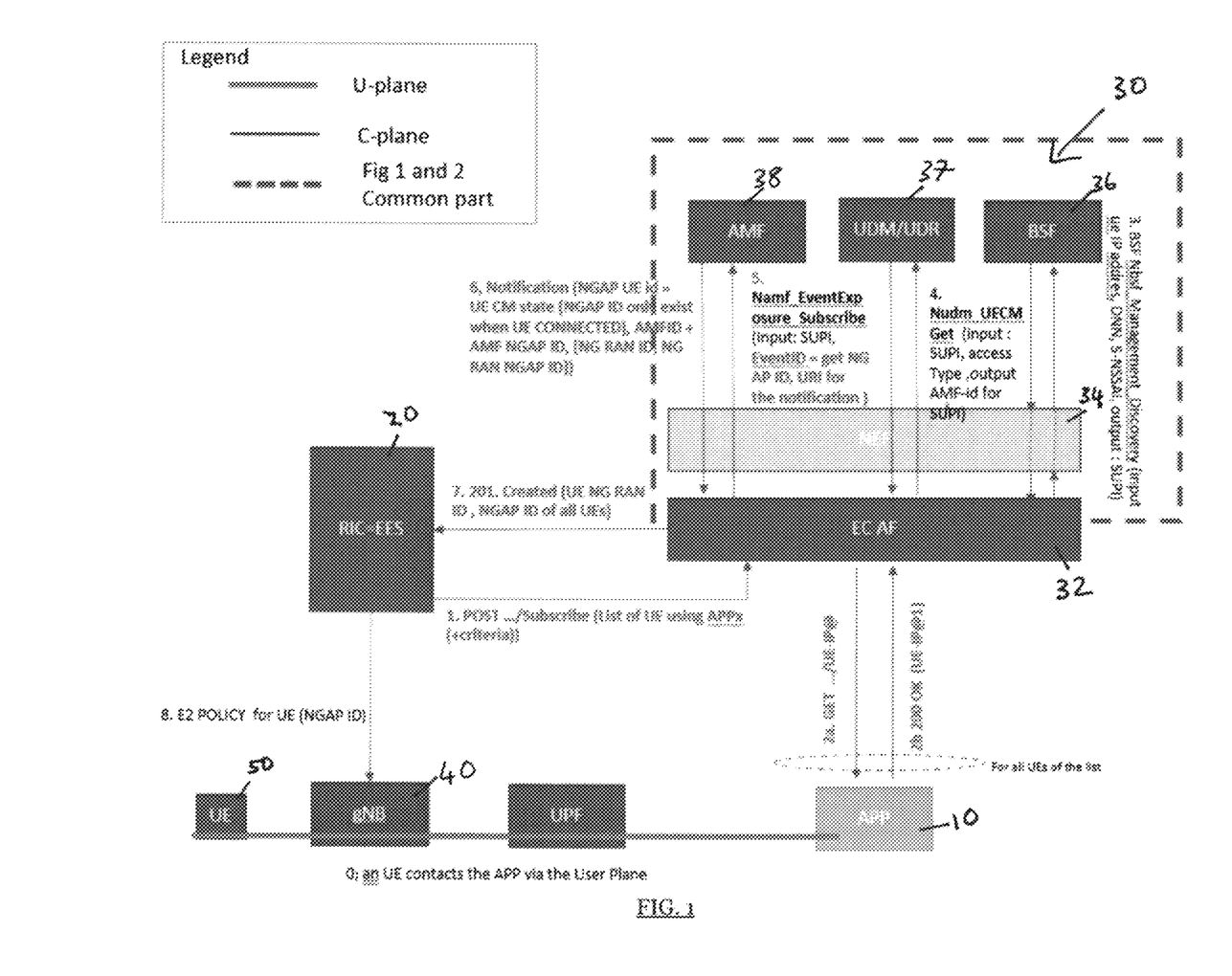
FIG. 1 illustrates a first example embodiment of an edge computing application requesting radio related information about a UE.
Figure 2:
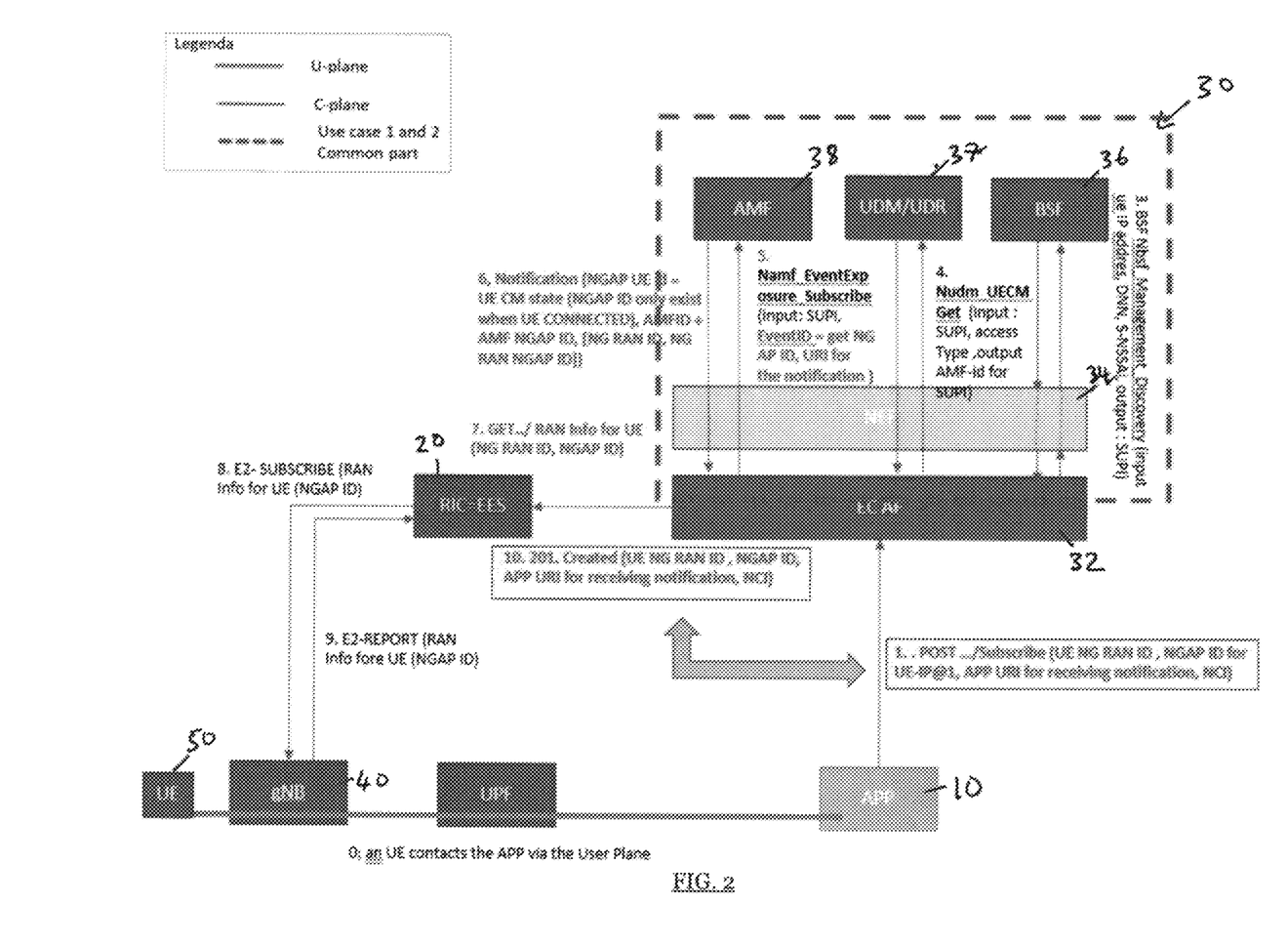
FIG. 2 illustrates a second example embodiment of a RIC requesting the NGAP IDs of user equipment whose traffic matches some criteria related with their IP address.

The 5GC supports an API allowing to determine the PCF serving a UE IP address: BSF Nbsf_Management_Discovery service operation currently defined (3GPP TS 23.502) as follows
- Inputs, Required: UE address (i.e. IP address or MAC address), DNN [Conditional], S-NSSAI [Conditional].
- Inputs, Optional: SUPI, GPSI.
- Outputs, Required: PCF address(es), PCF instance ID [Conditional, if available] and PCF Set ID [Conditional, if available], level of Binding [Conditional, if available] (see clause 6.3.1.0 of TS 23.501 [2]).
- Outputs, Optional: None Example embodiments describe two use example applications of the idea, these two use cases are shown in FIGS. 1 and 2 respectively and relate to identifying a specific UE and its related RAN information for:
- Use Case 1: a NF (network function), the RIC wants to set a POLICY (based on some criteria) for that specific UE (or a group of UEs) accessing a given service and/or
- Use Case 2: an Application (e.g. V2X, streaming) accessed by the UE and running on a server (e.g MEC, google cloud, etc.). The APP on the server needs UE related RAN information to tune the application with the UE radio condition (e.g. QoS aware application)

In these embodiments the UE 50 is served by 5G node 40 and is accessing an edge computing application 10.

FIG. 1 schematically illustrates use case 1 the application of UE specific policy by the RIC. The RIC requests the NGAP ID(s) of UE(s) whose traffic matches some criterial related with their IP address. Once the RIC receives the NGAP ID(s) of the UES(s) it can configure the RAN accordingly.

FIG. 2 schematically illustrates use case 2, an Edge computing Application (APP) running on an Edge Application Server (EAS) requests radio related information about a UE that the Application can only identify via addressing information (IP address, TCP/EDP port) that the UE uses to reach the Application.

In Use case 1 illustrated in FIG. 1: the RIC requires the NG RAN ID (s) (AMF UE NGAP ID and RAN UE NGAP ID) of UE whose traffic matches some criteria related with their usage of some application. Then when the RIC is aware of the NG RAN ID(s) of such UE, it can apply the UE-specific POLICY accordingly Use case 2 illustrated in FIG. 2 (and defined in 3GPP TR 23.748 on Edge Computing): an Edge Computing Application (APP) running on an Edge Application Server (EAS) requests radio related information about an UE that the Application can only identify via addressing information (IP address, TCP/UDP port) the UE uses to reach the Application. The APP contacts an Edge Computing Application Function (EC AF) to get radio related information about the UE and the EC AF gets the NGAP identifier of the UE in order to be able to fetch information (via the RIC) from the NG RAN serving the UE.

In the following, the NGAP information corresponds to the Global RAN Node ID (identity of the NG RAN) serving a UE and the NG RAN UE NGAP ID of this UE (identity of the UE context within that NG RAN, access network or core network assigned identifier).

The method involves at a high level 3 steps
- A) Initiation of the process (different between use Case 1 and Use case 2)
- B) Determination of NGAP information of a UE (common between use Case 1 and Use case 2)
- C) Usage of NGAP information of a UE (different between use case 1 and Use case 2)

A) Initiation of the Process
Use Case 1:
The RIC 20 SUBSCRIBES to the Core Network 30 to fetch the NGAP information of UE's whose traffic match some criteria including the usage of some application (APP), shown as step 1 in FIG. 1.

The Core Network entity handling the RIC request, in this example an EC AF 32 (Edge Computing application function), and the Core Network determines the IP address of UE(s) that match the criteria. In this example this is done via steps 2a and 2b, that is the EC AF 32 transmits a GET request to the edge computing application APP 10 requesting IP information for UE's using the APP and having certain criteria, such as a certain minimum bit rate. The APP 10 responds with the UE IP addressing information at step 2b.

Use Case 2:

An APP 10 issues a GET or SUBSCRIBE to UE Information (providing as input information: IP addressing information about the UE, APP URI for receiving notification, UE Information being requested) to the EC AF 32 at step 1.

B) Determination of NGAP Information of a UE, This is the Same in Both of the Use Cases Illustrated in FIGS. 1 and 2.

In the examples shown in FIGS. 1 and 2, the EC AF 32 communicates with the other functions or entities 36, 37 and 38 to retrieve the UE identifier information. In other embodiments, the EC AF 32 may communicate with the NEF (network exposure function) 34 which under control of the EC AF 32 communicates with the other functions 36, 37 and 38 to retrieve the UE identifier information.

In the embodiments shown the EC AF 32 sends a request, step 3 in the FIGS., to the BSF 36 (binding support function) requesting the UE SUPI (subscriber UE permanent identity), this is returned, and in step 4 the EC AF 32 sends a request to the UDM/UDR 37 (unified data management, unified data repository) requesting the identity of the AMF 38 serving the UE. This is returned to the EC AF 32 and in step 5, the EC AF 32 subscribes to an AMF event subscription: SUBSCRIBE (input: SUPI, EventID=get NGAP information about the UE, Access Type=3GPP). In response to this the AMF 38 notifies the EC AF 32 when NGAP information about the UE changes and provides that NGAP information at step 6.

NGAP information about the UE may change at UE Handover between NG RAN nodes or when the UE becomes IDLE (no more known by a NG RAN).

C) Usage of NGAP Information of an UE

Use case 1 (FIG. 1): the EC AF 32 (if the UE matches all criteria) sends at step 7 an answer to the RIC 20 with NGAP information about the UE. The RIC 20 can use this at step 8 to e.g. re-configure relevant parameters of the UE on the NG RAN node. This can be done at step 8 where a policy for the UE identified by the NGAP ID is sent to the gNB 40. The RIC 20 uses the NGAP information received at step 7 from the EC AF 32 to determine the gNB 40 to interface at step 8.

Use case 2, FIG. 2: the EC AF 32 sends a SUBSCRIBE or GET to the RIC 20 at step 7 to request information about a UE; The request details the information being requested, NGAP information about the UE along with the URI indicating where to deliver the information. The RIC 20 can GET the UE Information being requested from the NG RAN in this embodiment gNB 40, by requesting it at step 8 and receives it at step 9, whereupon it sends the UE Information to the URI identifying the APP 10 through EC AF 32 at step 10. The RIC 20 uses the NGAP information received at step 7 from the EC AF 32 to determine the gNB 40 to interface at step 8.

b) Different Deployment Options:

EC AF 32 and RIC 20 can be two different platforms or they can be a single platform. Nokia SEP product (Service Enable Platform) includes EC-AF (MEC), RIC together.

APP can be 1) MEC APP or 2) RIC xAPP in Near RT RIC, or 3) rAPPs in Non-RT RIC or hosted in a google cloud.

RIC: EC AF cardinality: In one embodiment, a number of gNBs could be connected to RIC. RIC address and its mapping to gNB 40 may be pre-configured on the EC AF.

c) UE mobility: In one embodiment, in case of inter-gNB handover, AMF notifies, through EC AF the new UE NG RAN ID and NGAP ID to the RIC (1 RIC connects multiple gNBs). The case of inter-RIC mobility is not considered since it is ffs in O-RAN, The RIC 20 uses the new NGAP information (new UE NG RAN ID) received in such notification from the EC AF 32 to determine the new gNB 40 to interface to monitor and/or influence network access functions about this UE.

NGAP Information may include (AMF UE NGAP ID, RAN UE NGAP ID, AMF ID, NG RAN NODE ID, UE Connection management state).

Further details of the example signaling performed in the different steps of FIGS. 1 and 2 is provided below A) Initiation of the Process Use case 1:

1) The RIC issues a SUBSCRIBE (any UE using an APP identified by an Application identifier [+other criteria]). The other criteria may contain information like a DNN and/or a S-NSSAI needed in step 3

2) The EC AF gets the IP address of the corresponding UE(s). This may correspond to the App issuing a NOTIFY each time its starts/stops serving a UE.

Use case 2:

1) An APP issues a GET or SUBSCRIBE to UE Information (providing as input information: IP addressing information about the UE, APP URI for receiving notification, UE Information being requested)

2) void

B) Determination of the NGAP Information of a UE

3. The EC AF through the NEF (Network Exposure Function) gets the UE-SUPI from the 5GC.

For this purpose, BSF Nbsf_Management_Discovery service operation (described in the clause 2 "background" of this invention report) is used. The API provides the SUPI as output of BSF Nbsf_Management_Discovery the information used by the EC AF in the phase A) "Initiation of the process" is used to determine the DNN and S-NSSAI. If the application or the RIC do not provide the DNN and S-NSSAI, the EC AF may determine them based on local configuration associated with the target application.

Note the Nbsf_Management_Register service operation already has the SUPI as Input: "Inputs, Optional: DNN, SUPI, GPSI, S-NSSAI, PCF instance ID and PCF Set ID, level of Binding (see clause 6.3.1.0 of TS 23.501 [2])." So the BSF may already know the SUPI of the UE;

4. Having obtained the SUPI, the EC AF asks the serving AMF serving the UE over 3GPP access from the UDM/UDR. The EC AF may also get extra information about the UE from UDM/UDR in order to check whether other criteria about the UE match.

5. The EC AF SUBSCRIBEs to AMF for an event to get the NGAP Information: this reuses the Namf_EventExposure_Subscribe service an provides following input information: target=SUPI or GPSI, URI for notification, requested Event ID There are following possibilities for the Event ID:
   a. defining a new EventID==NGAP Information where NGAP Information=Global RAN Node ID (identity of the NG RAN)+RAN UE NGAP ID+AMF UE NGAP ID, and AMF ID, +UE Connection management state; a new notification containing new values of Global RAN Node ID and RAN UE NGAP ID is sent by the AMF after a Hand-Over of the UE to a new NG RAN; a new notification is sent by the AMF if the UE goes to RRC INACTIVE state, if indicated by the NG-RAN node or UE goes to the IDLE UE Connection management state indicating that no Global RAN Node ID and RAN UE NGAP ID are available any more,
   b. as a variant a one shot SUBSCRIBE for the same Event than in case a. above is used to get once the information
   c as an alternative it could be possible to Reuse and upgrade the Connectivity state changes Event already defined (IDLE or CONNECTED) of the Namf_EventExposure_Subscribe service; in this case the CmInfo defined in TS 29.518 would contain the NGAP Information described in bullet a above.
6. The AMF notifies EC AF with the requested NGAP Information. This may contain the UE Connection management state which in case it has the value CM IDLE, means that the EC AF may tell its client that the UE is (possibly temporarily) no more to be considered C) Usage of NGAP Information of a UE Use Case 1:
7. If the UE meets all the criteria set by the RIC, EC AF Notifies the RIC with NGAP Information for the UE
8. The RIC can issue a UE-specific POLICY to the NG RAN.

Steps 8a and 8b are not shown in the message sequence in the figure
   8a) The non-RT RIC realizes a UE-specific POLICY over the A1 interface by including the UE ID retrieved from the EC AF.
   8b) The near-RT RIC identifies the UE based on UE ID provided by the non-RT RIC to implement the POLICY.
   NOTE: The same solution could be employed by the near-RT RIC to fetch RAN comprehensible UE ID, in case of generating autonomous UE-specific POLICY over E2.
   NOTE: In Nokia implementation, the UE IDs allocated by gNB-CU-CP on all interfaces i.e F1/E1/NG/Xn/X2 bear the same value. Hence it is just sufficient to identify the UE ID by the UE ID at the NG interface.
   NOTE: While examples have been given for E2 interface, it could be equally applicable for A1 interface where the non-RT RIC could execute the same set of steps to procure the RAN UE ID.

Use Case 2:
7. The EC AF issues a Get . . . /UE INFO (NGAP Information, APP URI for receiving notification, NCI, Requested UE information as received from the APP in step 1) to the RIC in order to get the information requested by the APP in step 1
8. The RIC Get from NGRAN Info about the UE, using NGAP Information to determine the NG RAN to contact and providing the NG RAN UE NGAP ID of this UE (identity of the UE context within that NG RAN).

When the RIC receives the NG RAN answer (step 10), it may filter it based on operator policies and forwards it to the URI received in step 7

As an alternative, for use case 2, the EC AF may issue a unique request for UE information to the NEF and delegate to the NEF the action of carrying out steps 3, 4 5 and 7 on its behalf.

In this case (delegation to the NEF), the NEF 34 sends a request, step 3 in the FIGS., to the BSF 36 (binding support function) requesting (Nbsf_Management_Discovery) the UE SUPI (subscriber UE permanent identity), this is returned, and in step 4 the NEF 34 sends a request to the UDM/UDR 37 (unified data management, unified data repository) requesting the identity of the AMF 38 serving the UE. This is returned to the NEF 34 and in step 5, the NEF 34 subscribes to an AMF event subscription: SUBSCRIBE (input: SUPI, EventID=get NGAP information about the UE, Access Type=3GPP). In response to this the AMF 38 notifies the NEF 34 when NGAP information about the UE changes and provides that NGAP information at step 6. The NEF 34 issues a Get . . . /UE INFO (NGAP Information, APP URI for receiving notification, NCI, Requested UE information as received from the EC AF) to the RIC in order to get the information requested by the APP in step 1; once it gets an answer from the RIC the NEF 34 propagates it to the EC AF for the EC AF to send it to the APP.

Figure 3:
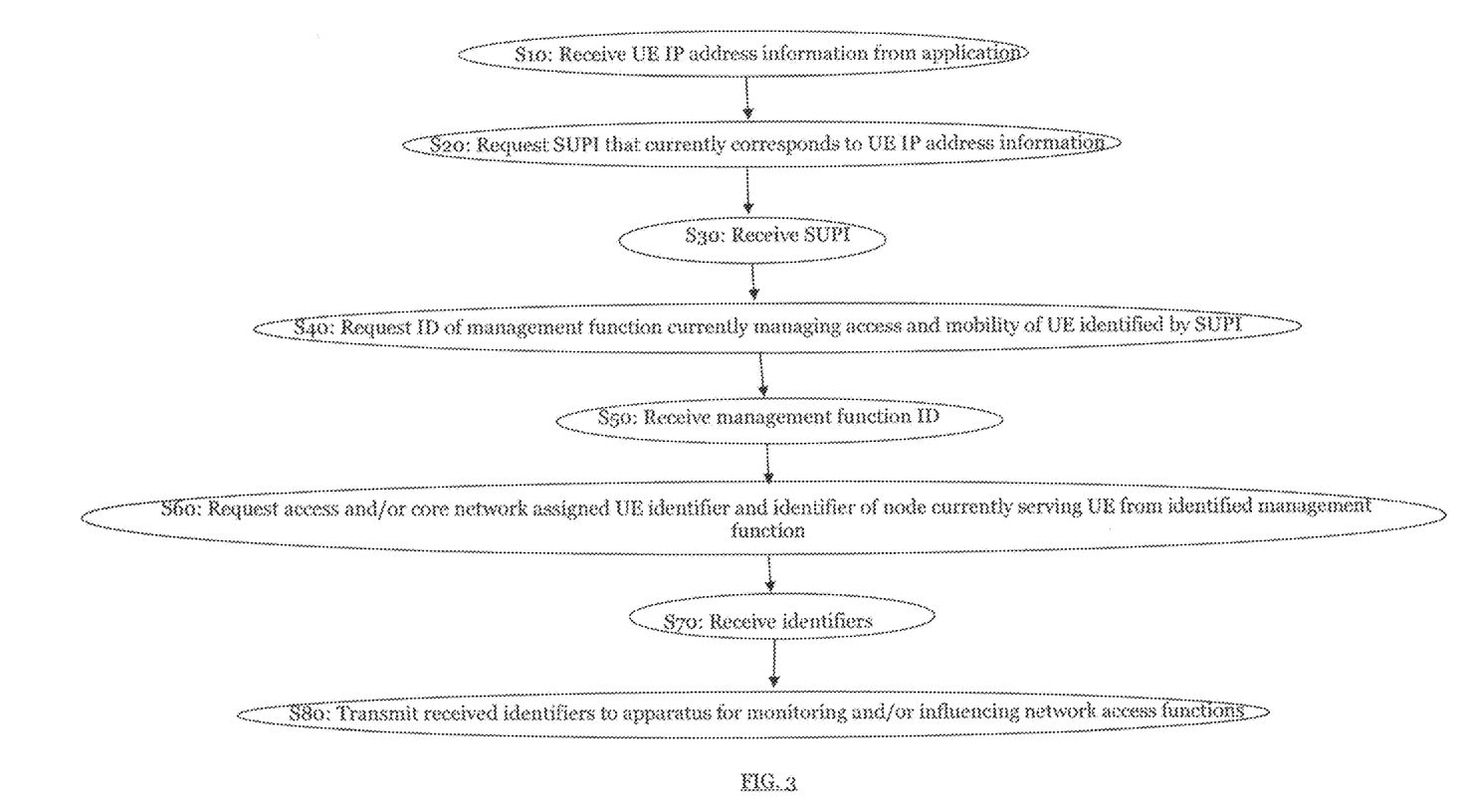
FIG. 3 schematically shows a flow diagram illustrating steps of a method according to an example embodiment.

FIG. 3 shows a flow diagram illustrating steps performed in a method according to an embodiment.

This method may be performed by a function on the core network. The function may be an EC AF that is an edge cloud application function or it may be performed by a NEF a network exposure function or by some other function that manages communication between the data network, for example the internet or the cloud, and the core network and which function is outside of the access and core networks.

In an initial step S10 UE IP addressing information is received from an application. This application may be an application running on an edge cloud server and providing data services to a UE. The information may be received as a notification from the application indicating each time it stops or starts serving a UE, or it may be in response to a request for information on UEs using the applications services. Where the steps of the method are performed by the network exposure function then this addressing information may be received from the edge cloud application function which itself may have received it from the application running on the edge cloud server and providing data services to a UE.

The IP addressing information may comprise the IP address itself and/or information regarding a port that the UE is connected to.

The next step S20 of the method is to request the SUPI that is the subscriber user equipment permanent identity that currently corresponds to the UE IP addressing information. There are functions within the core network such as the binding support function that can relate UE IP address information to the SUPI of the UE and thus, transmitting a request to such functions allows the SUPI to be retrieved at step S30.

The method then requests at step S40 the ID of the core function that is currently managing the access and the mobility of the UE identified by SUPI. The core function currently managing the access mobility of the UE is a function that terminates the access to core network interface and has information regarding the core or network assigned user equipment identifier and can relate this to its SUPI. This request may be sent to a data repository such as the unified data management or unified data repository within the core network which holds such information and the identity of the function currently managing the access mobility of the UE may be retrieved at step S50.

Once the function currently managing the access mobility of the UE has been identified a request for the access and/or core network assigned UE identifier and in some embodiments the identifier of the access node currently serving the UE can be sent to this function at step S60. The request may be in the form of a subscribe request which not only requests these identifiers but also requests when there are updates to these identifiers which will occur when the UE moves between access nodes.

These identifiers are then received at step S70 and the core function may transmit them to an apparatus for monitoring and/or influencing access network functions at step S80. This may be a RIC, that is a RAN intelligent controller and this can use the retrieved information to identify user equipment within the access network and communicate with the nodes serving the access network to apply policies to the UE and/or retrieved radio information for that UE as required.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   at least one processor; and
   at least one memory including computer program code, said at least one memory and computer program code being configured to, with said at least one processor, cause the apparatus to,
   transmit a request for IP addressing information of a user equipment matching a traffic criteria;
   receive the IP addressing information of the user equipment, the IP addressing information including an IP address and at least one of a TCP or UDP port of the user equipment;
   determine a subscriber permanent user identity for said user equipment from said IP addressing information;
   generate and transmit a request for at least one of an access network or core network assigned user equipment identifier, said request including said subscriber permanent user identity;
   receive said at least one of said access network or core network assigned user equipment identifier; and
   transmit a signal comprising said at least one of said access network or core network assigned user equipment identifier to an entity configured to monitor and/or influence network access functions.

2. The apparatus according to claim 1, wherein said request for said at least one of said access network or core network assigned user equipment identifier further comprises a request for an identifier of a node in said access network that is currently serving said user equipment.

3. The apparatus according to claim 1, wherein the at least one memory and the computer program code are configured to, with the at least one processor, cause the apparatus at least to
   generate a request requesting said subscriber permanent user identity of said user equipment, said request including the IP addressing information of said user equipment; and
   receive said subscriber permanent user identity of said user equipment.

4. The apparatus according to claim 1, wherein the at least one memory and the computer program code are configured to, with the at least one processor, cause the apparatus at least to retrieve both of the access network and core network assigned network user equipment identifier.

5. The apparatus according to claim 1, wherein the at least one memory and the computer program code are configured to, with the at least one processor, cause the apparatus, prior to generating said request for the at least one of said access network or core network assigned user equipment identifier, to:
   generate a request requesting an identity of a core entity managing access and mobility for said user equipment identified by said subscriber permanent user identity;
   transmit said request to a subscriber information data store; and
   in response to receiving the identity of the core entity, transmit said request for said at least one of said access network or core network assigned user equipment identifier to said identified core entity.

6. The apparatus according to claim 1, wherein said request for said at least one of said access network or core network assigned user equipment identifier comprises a subscribe request, said subscribe request requesting said at least one of said access network or core network assigned user equipment identifier and requesting updates to said at least one of said access network or core network assigned user equipment identifier.

* * * * *